United States Patent
Kwon

(10) Patent No.: US 7,864,455 B2
(45) Date of Patent: Jan. 4, 2011

(54) IMAGING LENS

(75) Inventor: Duk Keun Kwon, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/342,354

(22) Filed: Dec. 23, 2008

(65) Prior Publication Data

US 2009/0168202 A1    Jul. 2, 2009

(30) Foreign Application Priority Data

Dec. 27, 2007    (KR) .................. 10-2007-0138381

(51) Int. Cl.
  *G02B 9/14*    (2006.01)
  *G02B 13/18*   (2006.01)
  *G02B 3/02*    (2006.01)
(52) U.S. Cl. ................... 359/785; 359/716
(58) Field of Classification Search ............ 359/690, 359/716, 785
  See application file for complete search history.

(56) References Cited

U.S. PATENT DOCUMENTS

| 6,927,925 | B2 * | 8/2005  | Amanai ............. 359/785 |
| 7,468,847 | B2 * | 12/2008 | Tang ............... 359/785 |
| 7,660,050 | B2 * | 2/2010  | Sato et al. ........ 359/785 |
| 2008/0165430 | A1 * | 7/2008 | Bareau et al. ...... 359/690 |

FOREIGN PATENT DOCUMENTS

JP    2007-264182    10/2007

* cited by examiner

*Primary Examiner*—Alicia M Harrington
(74) *Attorney, Agent, or Firm*—Saliwanchik, Lloyd & Saliwanchik

(57) ABSTRACT

Disclosed is an imaging lens. The imaging lens includes a first lens having positive (+) power, a second lens having negative (−) power, and a third lens having positive (+) power and an inflection point on an imaging surface thereof facing an image side, wherein the first to third lenses are sequentially arranged from an object, and the second lens has power stronger than power of the first and third lenses.

18 Claims, 5 Drawing Sheets

IMAGING LENS

CROSS-REFERENCE TO RELATED APPLICATION

The present application claims the benefit under 35 U.S.C. §119 of Korean Patent Application No. 10-2007-0138381, filed Dec. 27, 2007, which is hereby incorporated by reference in its entirety.

BACKGROUND

Recently, image pickup systems such as a camera module for a communication terminal, a digital still camera (DSC), a camcorder, and a PC camera (a photographing device attached to a personal computer) have been studied and researched. The most important component allowing a camera module for the image pickup system to obtain an image is an imaging lens to form an image.

BRIEF SUMMARY

An embodiment provides an imaging lens module.

According to an embodiment, an imaging lens includes a first lens having positive (+) power, a second lens having negative (−) power, and a third lens having positive (+) power and an inflection point on an imaging surface thereof facing an image side, wherein the first to third lenses are sequentially arranged from an object, and the second lens has power stronger than power of the first and third lenses.

DETAILED DESCRIPTION

Hereinafter, an imaging lens according to an embodiment will be described in detail with reference to accompanying drawings.

Figure 1:
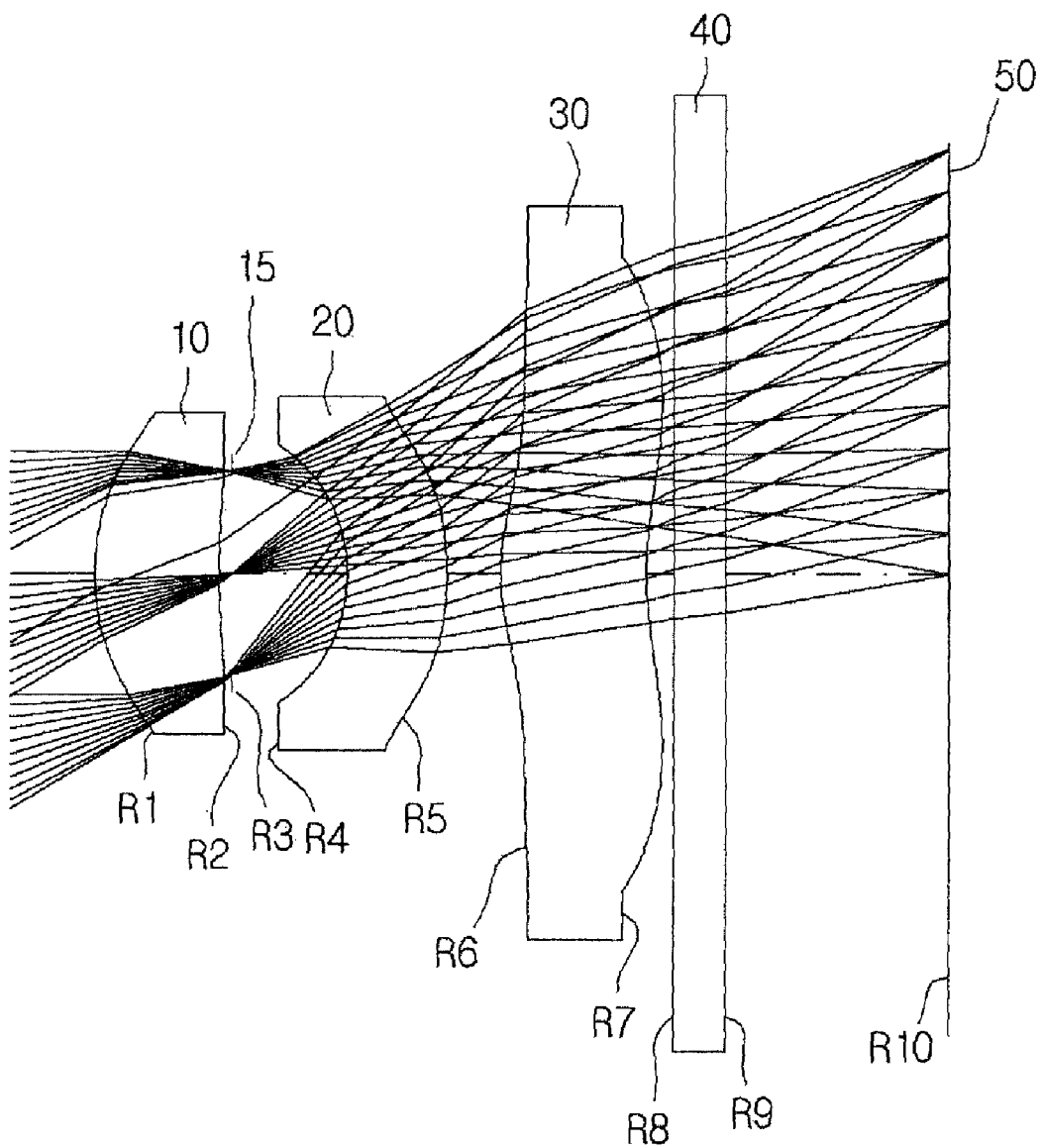
FIG. 1 is a side sectional view schematically showing an internal structure of an imaging lens according to an embodiment.

FIG. 1 is a side sectional view schematically showing an internal structure of the imaging lens according to an embodiment.

As shown in FIG. 1, the imaging lens according to the embodiment sequentially includes a first lens 10, an aperture 15, a second lens 20, a third lens 30, a filter 40, and a light receiving device 50 toward an image side R10 from an object.

In order to form an image of the object, light corresponding to image information of the object is incident onto the light receiving device 50 through the first lens 10, the aperture 15, the second lens 20, the third lens 30, and the filter 40.

The first lens 10 has positive (+) power, and is a meniscus-type lens having a convex surface facing the object and a concave surface facing the image side.

The second lens 20 has negative (−) power, and is a meniscus-type lens having a concave surface facing the object and a convex surface facing the image side.

The first and second lenses 10 and 20 have aspheric surfaces in a side of the object and a side of the image side thereof, and have no inflection point.

The third lens 30 has positive (+) power, and includes an aspheric inflection point.

Although an inflection point is not formed on the third lens 30 facing the object, but at least one aspheric inflection point may be formed on an imaging surface R7 of the third lens 30 facing the image side.

An imaging surface R7 of the third lens 30 is curved toward the image side in a region between the center and the peripheral side thereof, and then curved toward the object in a region between the peripheral side and the outermost portion thereof, thereby forming an aspheric inflection point.

In this case, the aspheric inflection point may be formed at a region ranging over 40% to 100% from the center of the third lens 30.

The aspheric inflection point of the third lens 30 can adjust the maximum angle of chief rays incident onto the light receiving device 50.

When the light receiving device 50, which is the image side R10, is a charge coupled device (CCD) sensor or a complementary metal oxide semiconductor (CMOS) sensor, the light receiving device 50 has an angle required to ensure an amount of light in each pixel. In the case of an unadjusted angle, the amount of light is not ensured, so that a peripheral portion of an image may be darkened, called by "shading."

Therefore, according to the embodiment, an aspheric inflection point is formed on the surface R7 of the third lens 30 facing the image side such that the maximum angle of chief rays becomes 25°or less. Accordingly, the peripheral portion of an image is inhibited from being darkened.

All of the first lens 10, the second lens 20, and the third lens 30 may include plastic, and all surfaces of the first lens 10, the second lens 20, and the third lens 30 may include an aspheric surface.

All surfaces of the first lens 10, the second lens 20, and the third lens 30 include an aspheric surface, and an aspheric inflection point is formed on the surface R7 of the third lens 30, so that spherical aberration, comatic aberration, and astigmatism can be corrected.

The second lens 20 has refractive power stronger than that of the first and third lenses 10 and 30. In addition, power of the second lens 20 is stronger than that of the first and third lenses 10 and 30.

The aperture 15 is interposed between the first and second lenses 10 and 20, and selectively receives light from the first lens 10 to adjust a focus length.

The filter 40 may include an infrared ray (IR) cut filter.

The IR cut filter inhibits radiant heat emitted from external light from being delivered to the light receiving device 50.

In other words, the IR cut filter transmits visible rays and reflects infrared rays to be exhausted to an exterior.

In addition, the light receiving device 50 forming an image may include an image sensor to convert an optical signal corresponding to an object image into an electrical signal, and the image sensor may include a CCD sensor or a CMOS sensor.

The imaging lens according to an embodiment has optical characteristics shown in following table 1.

TABLE 1

| Lens surface | Radius of curvature (mm) | Thickness (mm) | Refractive index (Nd) | Abbe number (Vd) | Remarks |
|---|---|---|---|---|---|
| R1* | 0.9630 | 0.5077 | 1.533 | 56.5 | |
| R2* | 3.6277 | 0.0500 | | | |
| R3 | ∞ | 0.4656 | | | aperture |
| R4* | −0.7100 | 0.4000 | 1.620 | 26 | |
| R5* | −1.7537 | 0.2173 | | | |
| R6* | 0.8890 | 0.5867 | 1.533 | 56.5 | |
| R7* | 1.5339 | 0.1134 | | | |
| R8 | ∞ | 0.2100 | 1.518 | 54.5 | filter |
| R9 | ∞ | 0.8994 | | | filter |
| R10 | ∞ | 0 | | | sensor |

("*" represents an aspheric surface)

As shown in table 1, in the imaging lens according to the embodiment, all surfaces of the first to third lenses 10 to 30 are an aspheric surface.

In table 1, the thickness represents a distance from each lens surface to a next surface, and the refractive index Nd and the Abbe number Vd are measured with respect to d rays ($\lambda$=587.6 nm).

The refractive index Nd of the imaging lens according to the embodiment may satisfy the following conditions without being limited to values of table 1.

$1.5 \leq Nd \leq 1.65$ [$1^{st}$ lens]

$1.55 \leq Nd \leq 2.0$ [$2^{nd}$ lens]

$1.5 \leq Nd \leq 1.65$ [$3^{rd}$ lens]

Under the above conditions for the refractive index Nd, the imaging lens can be designed to include the second lens 20 having power stronger than that of the first and third lenses 10 and 30.

The Abbe number Vd of the imaging lens according to the embodiment may satisfy the following conditions without being limited to values of table 1.

$50 \leq Vd \leq 65$ [$1^{st}$ lens]

$20 \leq Vd \leq 50$ [$2^{nd}$ lens]

$50 \leq Vd \leq 65$ [$3^{rd}$ lens]

Under the above conditions for the Abbe number Vd, chromatic aberration can be corrected.

Following table 2 shows an aspheric constant for an aspheric surface according to an embodiment.

The aspheric constant of table 2 for the aspheric lens according to the embodiment can be obtained from following equation 1.

$$z = \frac{CY^2}{1+\{1-(1+K)(C^2Y^2)\}} + (A_1)Y^4 + (A_2)Y^6 + (A_3)Y^8 + (A_4)Y^{10} + (A_5)Y^{12}$$

Equation 1

Z: distance from apex of lens in direction of optical axis

C: fundamental curvature of lens

Y: distance in direction perpendicular to optical axis

K: conic constant $A_1, A_2, A_3, A_4, A_5$: aspheric constants

The first to third lenses 10 to 30 having the aspheric constants while satisfying the above conditions for the refractive index Nd and the Abbe number Vd and having the aspheric constants are utilized, so that spherical aberration, comatic aberration, and astigmatism can be corrected. In addition, distortion can be corrected.

A focus length (f) of the whole optical system of the above imaging lens according to the embodiment, a focus length of each lens, a distance ($\Sigma T$) from a surface of the first lens 10 facing the object to an image side, an F-number, and an angle of view are shown in following table 3.

TABLE 3

| | |
|---|---|
| Focus length (f) of optical system | 2.8995 mm |
| Focus length (f1) of $1^{st}$ lens | 2.3050 mm |
| Focus length (f2) of $2^{nd}$ lens | −2.2550 mm |
| Focus length (f3) of $3^{rd}$ lens | 3.0115 mm |
| Distance ($\Sigma T$) from surface (R1) of $1^{st}$ lens facing object to image side | 3.45 mm |
| F-number | 2.9 |
| Angle of view | 62.2 deg. |

In this case, the ratio (f1/f) of the focus length (f1) of the first lens 10 to the focus length (f) of the optical system is 0.795, and the ratio ($\Sigma T/f$) of the distance ($\Sigma T$) from the surface R1 of the first lens 10 facing the object to the image side R10 to the focus length (f) of the optical system is 1.19.

However, the ratio (f1/f) of the focus length (f1) of the first lens 10 to the focus length (f) of the optical system; and the ratio ($\Sigma T/f$) of the distance ($\Sigma T$) from the surface R1 of the first lens 10, which is provided at the object, to the image side

TABLE 2

| lens surface | C | K | $A_1$ | $A_2$ | $A_3$ | $A_4$ | $A_5$ |
|---|---|---|---|---|---|---|---|
| R1 | 1.0384 | 0.605298 | $-0.912446 \times 10^{-1}$ | $-0.319177 \times 10^{-1}$ | $-0.129829 \times 10^1$ | $0.338573 \times 10^1$ | $-0.682828 \times 10^1$ |
| R2 | 0.2757 | 0 | −0.136429 | 0.313900 | $-0.508086 \times 10^1$ | $0.925559 \times 10^1$ | 0 |
| R4 | −1.4085 | −9.658034 | $-0.371460 \times 10^1$ | $0.174187 \times 10^2$ | $-0.847792 \times 10^2$ | $0.251698 \times 10^3$ | $-0.336595 \times 10^3$ |
| R5 | −0.5702 | 0.748531 | $-0.152309 \times 10^1$ | $0.460940 \times 10^1$ | $-0.948167 \times 10^1$ | $0.139400 \times 10^2$ | $-0.808504 \times 10^1$ |
| R6 | 1.1248 | −6.664516 | −0.656298 | 0.907868 | −0.659074 | 0.259738 | $-0.434700 \times 10^{-1}$ |
| R7 | 0.6519 | −1.164312 | −0.531759 | 0.398568 | −0.208635 | $0.635397 \times 10^{-1}$ | $-0.861904 \times 10^{-2}$ |

R10 of the first lens 10, to the focus length (f) of the optical system may satisfy the following conditions without being limited to the value.

$$0.5 < f1/f < 1.5 \quad \text{Condition 1}$$

$$0.5 < \Sigma T/f < 1.5 \quad \text{Condition 2}$$

Conditions 1 and 2 are conditions to realize a small-sized imaging lens and correct the spherical aberration.

If the imaging lens is designed with ratios smaller than those shown in Conditions 1 and 2, the imaging lens may be small-sized. However, aberration cannot be corrected. If the imaging lens is designed with ratios greater than those shown in Conditions 1 and 2, the aberration may be easily corrected. However, the imaging lens cannot be small-sized.

In other words, under the Conditions 1 and 2, the aberration can be easily corrected, and the imaging lens can be small-sized.

In addition, the imaging lens according to the embodiment can satisfy the following conditions $$|f1/f2| > 1.0 \quad \text{Condition 3}$$

$$|f3/f2| > 1.0 \quad \text{Condition 4}$$

Under Conditions 3 and 4, the imaging lens can be designed to include the second lens having power stronger than that of the first and third lenses 10 and 30.

Following table 4 shows a chief ray angle (CRA) of an image sensor according to image sides of the imaging lens according to the embodiment and a CRA of the imaging lens according to the embodiment.

TABLE 4

| Field | sensor CRA | lens CRA | CRA difference |
|---|---|---|---|
| 0.0F | 0.0° | 0° | 0° |
| 0.1F | 3.7° | 3.86° | 0.16° |
| 0.2F | 7.3° | 7.86° | 0.56° |
| 0.3F | 10.8° | 11.47° | 0.67° |
| 0.4F | 14.2° | 15.01° | 0.81° |
| 0.5F | 17.3° | 18.10° | 0.80° |
| 0.6F | 20.1° | 20.51° | 0.41° |
| 0.7F | 22.4° | 22.55° | 0.15° |
| 0.8F | 24.1° | 24.01° | −0.09° |
| 0.9F | 24.9° | 24.94° | 0.04° |
| 1.0F | 24.9° | 24.88° | −0.02° |

The sensor CRA allows the light receiving device 50 according to the embodiment to ensure an amount of light, and the lens CRA represents a CRA of chief rays incident onto the light receiving device 50 according to the embodiment. The CRA difference represents difference between the sensor CRA and the lens CRA.

In this case, as the CRA difference is reduced, an amount of light incident onto the light receiving device 50 can be ensured. Accordingly, it is possible to inhibit shading to darken a peripheral portion of an image.

Figure 4:
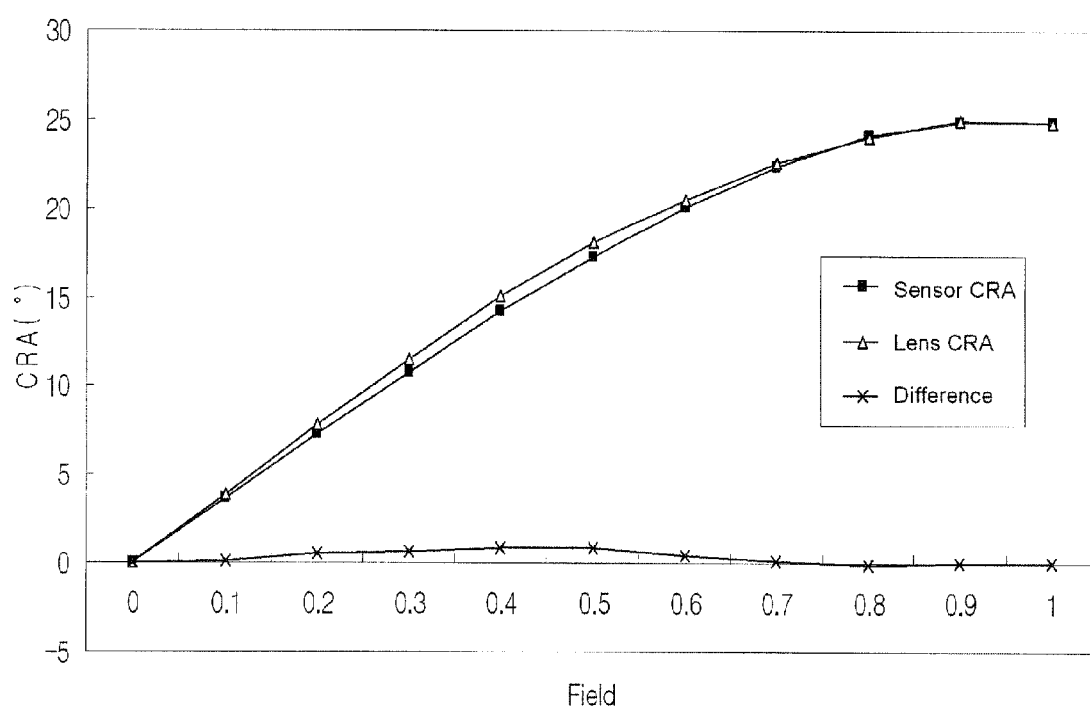
FIG. 4 is a graph showing a chief ray angle (CRA) of an image sensor and a CRA of the imaging lens as a function of the field of the imaging lens according to the embodiment.

FIG. 4 is a graph showing the CRA of the image sensor according to image sides of the imaging lens according to the embodiment and the CRA of the imaging lens according to the embodiment.

It can be noted from FIG. 4 that CRA difference between the sensor CRA and the lens CRA is small.

Therefore, according to the embodiment, an aspheric inflection point is formed on the surface R7 of the third lens 30 facing the image side to reduce the maximum CRA to 25° or less, and the CRA difference has a small value, so that it is possible to inhibit the peripheral portion of an image from being darkened.

Figure 2:
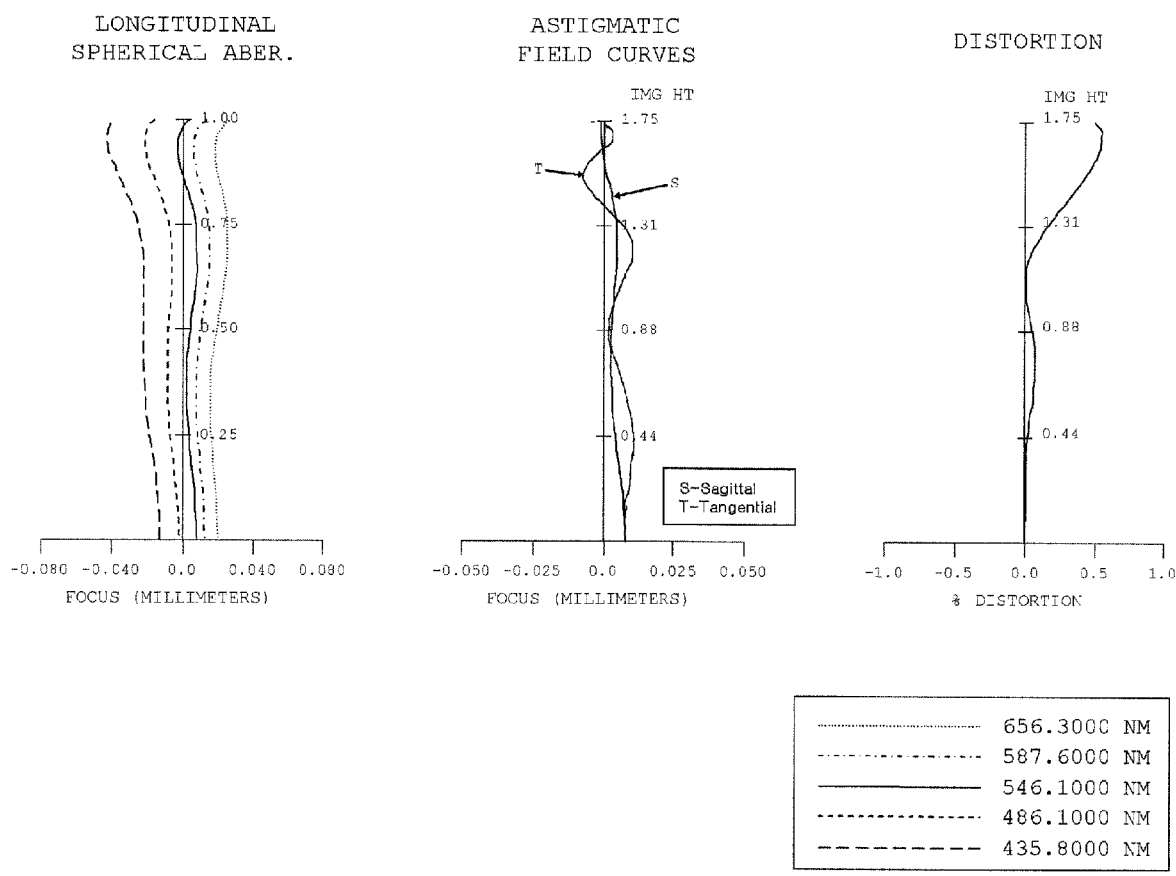
FIGS. 2, 3A, and 3B are graphs showing an aberration characteristic of an imaging lens according to an embodiment.
Figure 3A:
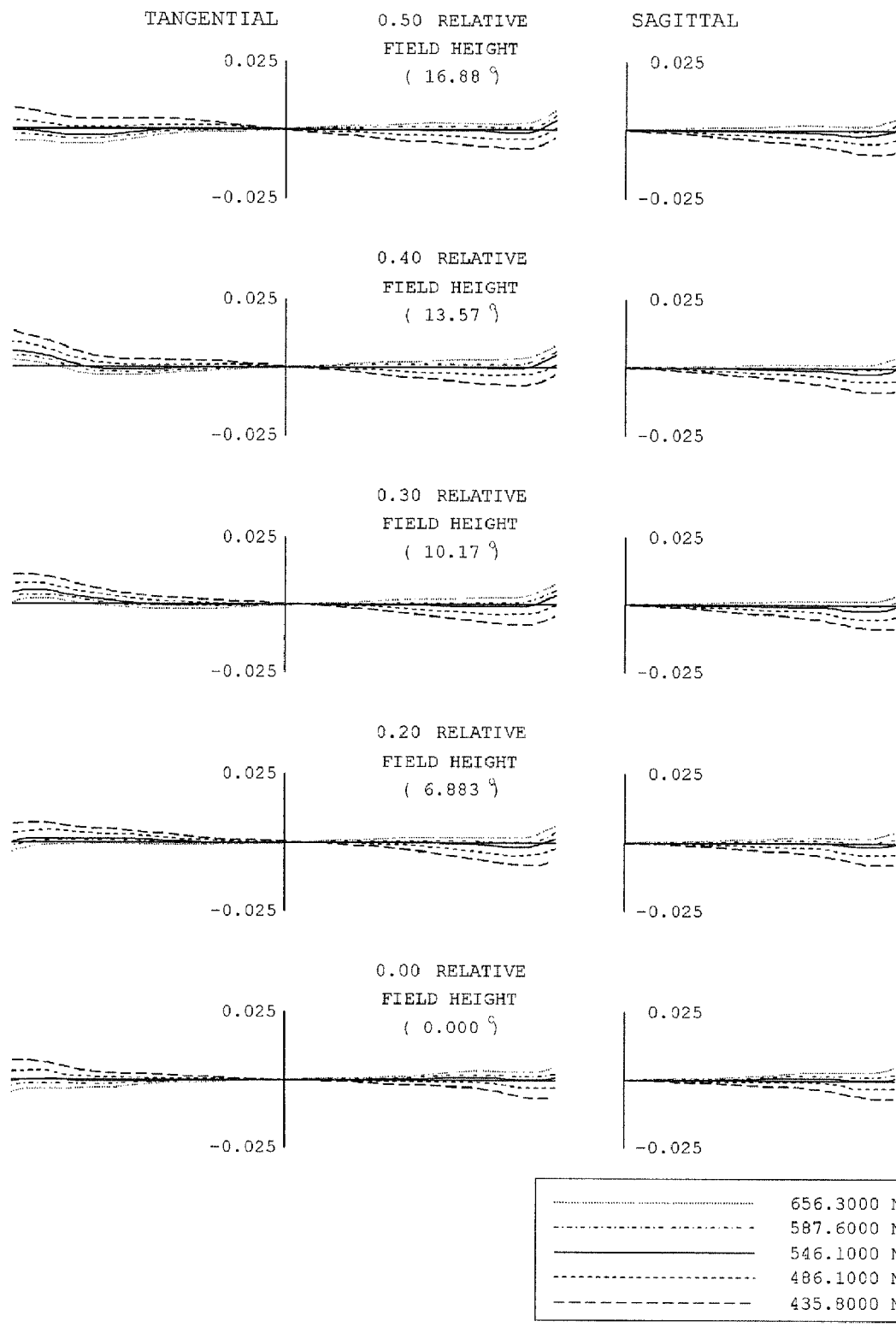
Figure 3B:
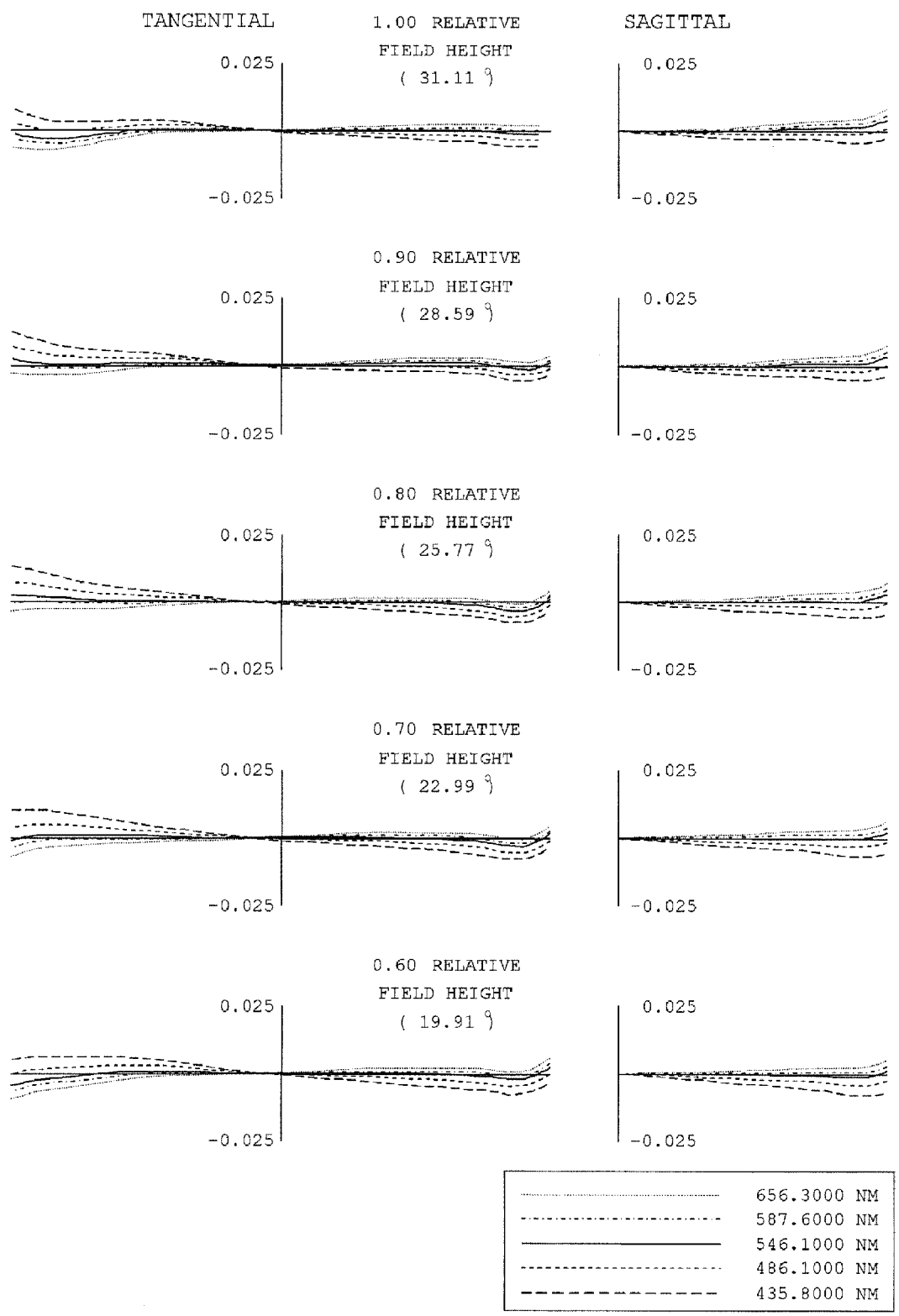

FIGS. 2, 3A, and 3B are graphs showing aberration characteristics of the imaging lens according to the embodiment.

FIG. 2 is a graph showing measured values of spherical aberration, astigmatic field curves, and distortion aberration.

FIGS. 3A and 3B are graphs showing a measured value of comatic aberration.

As shown in FIGS. 2 to 3B, since image values are shown nearby an optical axis in most of image sides, the imaging lens according to the embodiment has superior aberration characteristics.

The spherical aberration is measured according to c rays ($\lambda$=656.3 nm), d rays ($\lambda$=587.6 nm), e rays ($\lambda$=546.1 nm), f rays ($\lambda$=486.1 nm), and g rays ($\lambda$=435.8 nm). The astigmatic field curves represent aberration characteristics of a tangential plane and a sagittal plane according to image side heights. The distortion aberration represents a distortion degree according to the image side heights.

The comatic aberration represents aberration characteristics of the tangential plane and the sagittal plane according to the image side heights in each wavelength.

In the imaging lens according to the embodiment, the second lens 10 has power stronger than that of the first and third lenses 20 and 30, and the imaging lens is realized by employing the third lens having an aspheric inflection point formed on the imaging surface R7 thereof facing the image side, so that superior aberration characteristics can be obtained. In addition, three pieces of lenses are employed, so that the imaging lens can be small sized.

In addition, the aspheric inflection point is formed on the imaging surface R7 of the third lens facing the image side to reduce the maximum CRA to 25° or less, and the CRA is adjusted to inhibit a peripheral portion of an image from being darkened.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An imaging lens comprising:
   a first lens having positive (+) power;
   a second lens having negative (−) power; and
   a third lens having positive (+) power and an inflection point on an imaging surface thereof facing an image side, wherein the first to third lenses are sequentially arranged from an object, and the second lens has power stronger than power of the first and third lenses;

wherein a condition, $|f1/f2|>1.0$, is satisfied in which f1 represents a focus length of the first lens and f2 represents a focus length of the second lens.

2. The imaging lens of claim 1, wherein all surfaces of the first to third lenses are an aspheric surface.

3. The imaging lens of clam 1, wherein at least one aspheric inflection point is formed on the imaging surface of the third lens facing the image side.

4. The imaging lens of claim 1, wherein the inflection point of the third lens is formed by curving the imaging surface of the third lens toward the image side in a region between a peripheral portion and a central portion thereof, and by curving the imaging surface of the third lens toward the object in a range between an outermost portion and the peripheral portion thereof.

5. The imaging lens of claim 1, wherein the inflection point of the third lens is formed in an area ranging over 40% to 100% from a central portion of the third lens.

6. The imaging lens of claim 1, wherein the third lens has a maximum chief ray angle of 25°.

7. The imaging lens of claim 1, further comprising an aperture interposed between the first and second lenses.

8. The imaging lens of claim 1, further comprising a filter to cut off infrared rays from incident light.

9. The imaging lens of claim 8, wherein the filter is positioned more closely to an image side as compared with the third lens.

10. The imaging lens of claim 1, wherein the first lens includes a convex surface facing the object and a concave surface facing the image side.

11. The imaging lens of claim 1, wherein the second lens includes a concave surface facing the object and a convex surface facing the image side.

12. The imaging lens of claim 1, wherein the first and second lenses include a meniscus-type lens.

13. The imaging lens of claim 1, wherein the first to third lenses include plastic.

14. The imaging lens of claim 1, wherein a condition, $0.5<f1/f<1.5$, is satisfied in which f represents a whole focus length of the imaging lens and f1 represents a focus length of the first lens.

15. The imaging lens of claim 1, wherein a condition, $0.5<\Sigma T/f<1.5$, is satisfied in which f represents a whole focus length of the imaging lens and $\Sigma T$ represents a distance from a light incidence surface of the first lens facing the object to the image side.

16. The imaging lens of claim 1, wherein a condition, $|f3/f2|>1.0$, is satisfied in which f2 represents a focus length of the second lens, and f3 represents a focus length of the third lens.

17. The imaging lens of claim 1, wherein the first to third lenses have a refractive index (Nd) satisfying following conditions:

$1.5 \leq Nd \leq 1.65$ (first lens);

$1.55 \leq Nd \leq 2.0$ (second lens); and $1.5 \leq Nd \leq 1.65$ (third lens).

18. The imaging lens of claim 1, wherein the first to third lenses have an Abbe number (Vd) satisfying following conditions:

$50 \leq Vd \leq 65$ (first lens);

$20 \leq Vd \leq 50$ (second lens); and $50 \leq Vd \leq 65$ (third lens).

* * * * *